United States Patent
Czyzewski

(10) Patent No.: US 8,880,364 B2
(45) Date of Patent: Nov. 4, 2014

(54) METHOD AND APPARATUS FOR DETECTION OF SHORT STRESS WAVES

(76) Inventor: Zbigniew Czyzewski, Henderson, NV (US)

( * ) Notice: Subject to any disclaimer, the term of this patent is extended or adjusted under 35 U.S.C. 154(b) by 495 days.

(21) Appl. No.: 13/421,632

(22) Filed: Mar. 15, 2012

(65) Prior Publication Data

US 2012/0245867 A1    Sep. 27, 2012

Related U.S. Application Data

(60) Provisional application No. 61/468,062, filed on Mar. 27, 2011.

(51) Int. Cl.
*G01H 1/12* (2006.01)

(52) U.S. Cl.
CPC ........................................ *G01H 1/12* (2013.01)
USPC ............................................................ 702/56

(58) Field of Classification Search
CPC ......................................................... G01H 1/12
USPC .............................................................. 702/56
See application file for complete search history.

(56) References Cited

U.S. PATENT DOCUMENTS 5,852,793 A * 12/1998 Board et al. .................... 702/56
5,895,857 A    4/1999 Robinson et al.

* cited by examiner

*Primary Examiner* — Bryan Bui
(74) *Attorney, Agent, or Firm* — Howard & Howard Attorneys PLLC

(57) ABSTRACT

Systems, apparatuses, and methods for measuring microscopic vibration of machines, which include the use of a selectable high pass or band pass filter and an average power processor unit, among other things.

4 Claims, 3 Drawing Sheets

METHOD AND APPARATUS FOR DETECTION OF SHORT STRESS WAVES

CROSS-REFERENCE TO RELATED APPLICATIONS

This application claims the benefit of U.S. Provisional Patent Application No. 61/468,062 filed Mar. 27, 2011, the disclosure of which is incorporated herein by reference.

FIELD OF THE INVENTION

The invention is generally concerned with an improved vibration sensing and analysis method and apparatus for short term stress waves or other short term events caused by rotating machinery faults which can be detected using vibration sensors. More specifically, this disclosure includes embodiments of the invention that relate to a method and apparatus for measuring macroscopic and microscopic vibration of machines, which includes the use of a selectable high pass or band pass filter and an average power processor unit.

BACKGROUND OF THE INVENTION

Vibration analysis, applied on a scheduled basis for machine-conditioning monitoring, has proven itself to be very beneficial toward controlling cost associated with maintenance of industrial machinery. The general procedure for implementation is to acquire data and data analysis on a predefined schedule. The equipment employed typically is portable data collector/analyzer combined with a software package residing on a personal computer or Internet.

In addition to the oscillatory motion (vibration) introduced on a macroscopic scale, many faults commonly experienced in bearings, gears, etc., also introduce, on a microscopic scale, stress wave packets which propagate away from the initiation site at the speed of sound in the media (e.g., metal). These stress wave packets are short-term, fractional to a few milliseconds, transient events which accompany events such as metal-to-metal impacting, fatigue cracking, friction, and similar events. The stress waves induce an output in an accelerometer (which responds to absolute motion) or other sensor. Since an accelerometer is generally the sensor of choice for the macroscopic (vibration) motion monitoring, it is logical to also adopt the accelerometer as the sensor of choice for stress wave analysis. Detailed analysis of these stress wave packets provides valuable insight to the presence of mechanical faults as well as assistance in identifying the severity of the fault. Typically, the stress activity is easily separated from the more macroscopic (vibration) motion activity simply by routing the sensor (accelerometer) through a high pass filter (or a band pass filter) to reject the lower frequency vibration driven component of the sensor (accelerometer) output.

Several papers and patents have been published over the years on the analysis of stress waves. One of the most commonly used methods is a peak value method described in U.S. Pat. No. 5,895,857 to Robinson et al. In general, the peak value method comprises the steps of: a.) sensing motion, including a stress wave component; b.) separating the stress wave component from other components with a high pass filter to create a signal proportional to the stress wave; c.) processing the amplified signal with a sample and hold peak detector over a predetermined interval of time to determine peaks of the amplified signal over said predetermined period of time; e.) creating an output signal proportional to the determined peaks of the amplified signal and performing the Fast Fourier Transform to detect any frequency peaks corresponding to the frequency of events causing the stress waves.

SUMMARY OF THE INVENTION

The invention provides an alternative to the peak value method and other similar approaches, among other things. The peak value method and other similar methods create a new signal from a vibration signal and could be considered broadly as a signal decimation method with the sufficient number of signal points corresponding to the predetermined number of lines for Fast Fourier Transform. This is the standard method of reducing the number of points when resulting Fast Fourier Transform has significantly smaller number of lines. The present invention creates a new signal as well; however it is quite different from the peak value and other similar methods.

In some embodiments, the invention comprises a method and apparatus for sensing and measuring stress waves.

In one embodiment, the method comprises the steps of: sensing motion comprising of a stress wave or short term vibration event and macro scale vibration component, and converting the motion into some kind of measurable signal like electrical or optical or other type of signal; separating the stress wave or short term vibration event from macro scale vibration component with a high pass filter or band pass filter applied to the measurable signal, wherein the resulting filtered signal is proportional to the stress wave or other short term vibration event; acquiring and digitizing the filtered signal; processing the digitized filtered signal for each predetermined interval of time (macro-sample time interval) using a short term energy measure (or average signal power) calculated over a short time window being a fraction of said predetermined interval of time, wherein the calculations are performed using sliding time window and are done for every distinct time window position within the predetermined interval of time; creating a single or multiple output signals by selecting a maximum short term energy value calculated for said predetermined interval of time from all other short term energy values calculated for said predetermined interval using sliding short time window, wherein multiple signals are created by changing the duration of the sliding window; and performing a single or multiple Fast Fourier Transform (FFT) calculations to determine a presence of a stress wave and characterize its duration.

In some embodiments of the aforementioned method, the duration of said short term window for average power calculations is configurable to at least two different values and calculations of the average power for different window durations are performed simultaneously.

The invention also includes an apparatus for implementing the aforementioned method of the invention, among other things.

In one embodiment, an apparatus constructed in accordance with the invention for sensing and analyzing the stress waves and other similar short term vibration events, comprises a vibration sensor; a signal conditioner with high pass or band pass filter; a digital acquisition unit a processor; and a memory or programmable logic device which stores a program implementing methods of the invention.

In one embodiment of the apparatus of the invention, the apparatus further comprises an accelerometer to create at least one vibration signal, and an electronic processor to perform the remaining steps of the method.

As described herein, it is at least one general object of the invention to provide a method and apparatus for sensing, measuring and characterizing stress waves.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of an method and apparatus for stress wave detection.

DETAILED DESCRIPTION OF THE INVENTION

Reference will now be made to embodiments of apparatuses, systems, and methods for stress wave detection, examples of which are illustrated in the accompanying drawings. Details, features, and advantages of the invention will become further apparent in the following detailed description of embodiments thereof. It is to be understood that the figures and descriptions included herein illustrate and describe elements that are of particular relevance to stress wave detection, while eliminating, for purposes of clarity, other elements found in typical systems for vibration analysis and fault detection.

Systems, apparatuses, and methods to perform stress wave detection are described herein. Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the or'ed terms or more than one or'ed term.

In a preferred embodiment the present invention detects the presence of vibration and stress waves in machines and outputs the frequencies of stress wave activity over a predetermined period of time. In a preferred embodiment, the time period for detecting the presence of the stress waves comprises five or more revolutions of a rotating element of a machine comprising a rotating element. It should be noted, however, that five revolutions are not required to determine a time period.

The output of the apparatus may be analyzed (trended) and used to initiate alert/fault levels. The alert/fault levels may have predetermined action levels that may be executed by appropriate groups.

When monitoring stress wave activity, healthy machinery has none or very little stress wave activity (less than 0.5 g). Machinery with faults can have significant g-levels (50.0 g). Therefore, the dynamic range of the present invention might be modified to detect stress wave activity over a high dynamic range by employing a logarithmic amplifier, which is readily available with a 100 dB dynamic range.

Figure 1:
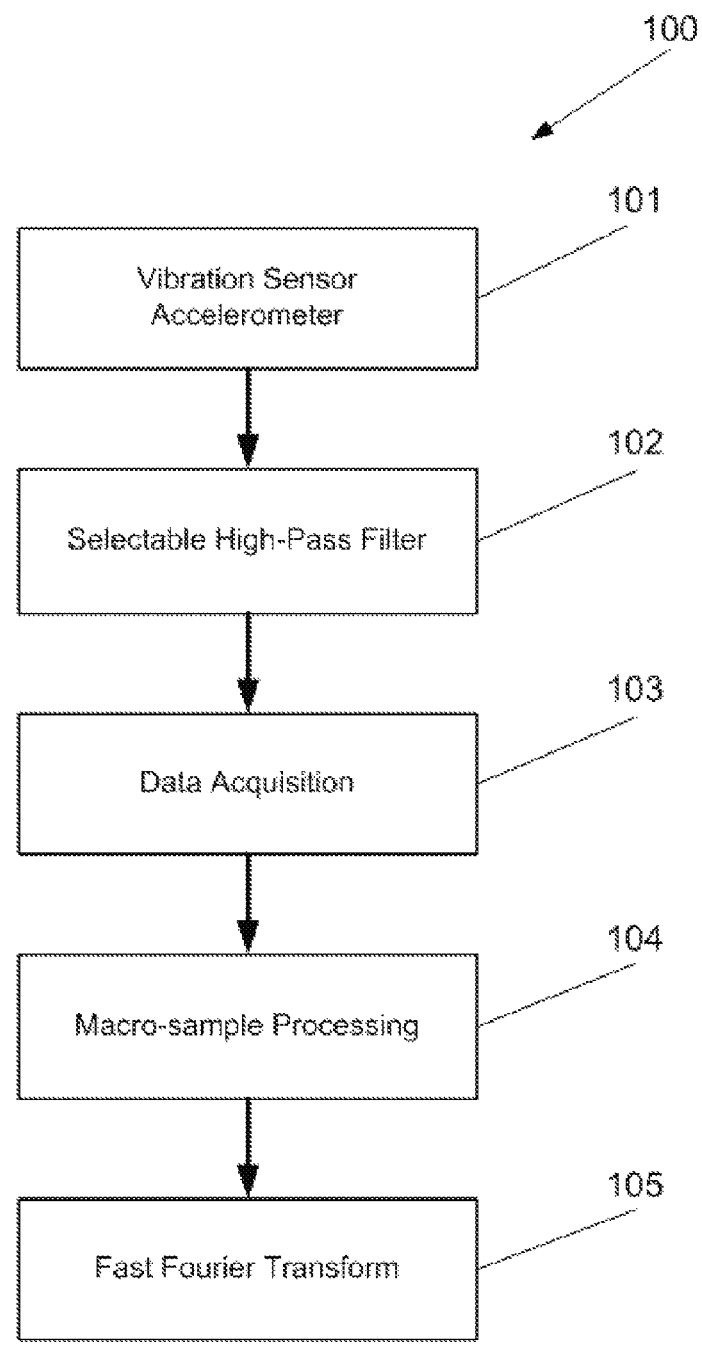
FIG. 1 illustrates an embodiment of the method for stress wave detection; it is a flowchart outlining the steps of the method of the invention.

FIG. 1 illustrates an embodiment of vibration analysis 100, shown to comprise a vibration sensor (accelerometer) 101, selectable high-pass filter 102, data acquisition unit 103, data processing unit 104 and FFT output 105. Accelerometer 101 is a well-known device for measuring macroscopic and microscopic vibration. The vibration signals are passed from the accelerometer to high-pass filter 102, which in a preferred embodiment is a selectable high-pass filter. In one embodiment, the user can choose an analog selectable high-pass filter with selectable frequencies in the 1-20 KHz range. The reason for the selectable filter is that known fault frequencies exist in the 3-4 KHz range. In another embodiment, a digital high-pass filter can be employed. If such digital high-pass filter is used, the digital data acquisition 103 must be performed first. After signal is high-pass filtered and digitized, it is then passed to macro-sample processing unit 104, which is described in detail in FIG. 2. In yet another embodiment a band-pass filter can be used in place of high pass-filter to reduce the amount of high-frequency noise as well.

Macro-sample is a set of data acquired in said predetermined interval of time corresponding to the maximum frequency, $f_{MAX}$, in FFT calculations. If $f_{MAX}$ is equal for instance to 200 Hz, then the sampling frequency $f_{SFFT}$ for FFT should be at least twice as high to avoid aliasing, $f_{SFFT}$=400 Hz, which correspond to FFT sampling interval of $T_{SFFT}$=1/$f_{SFFT}$. $f_{SFFT}$, resulting in 2.5 ms. The FFT sampling interval $T_{SFFT}$ is the said predetermined interval of time. Since stress wave packets are short-term, fractional to a few milliseconds, at least 10,000 to 50,000 samples per second is needed to obtain several data samples over the span of stress wave activity. Assuming 50 KHz sampling frequency $f_S$ and FFT sampling interval $T_{SFFT}$ of 2.5 ms, the resulting macro-sample consists of 125 data points. Over these 125 data points a short-term average power is calculated using sliding time window and the maximum value is selected as a data point to Fast Fourier Transform. The maximum value of short-term average power is used as a measure of strongest vibration activity within the macro-sample interval of time, which likely would be the stress wave. The short-term average power is calculated using fixed number of data points. In the simplest case it would be a single point. The FFT calculations 105 provide a set frequencies associated with strong micro vibration events. In order to avoid any false vibration readings the number of points used to calculate short-term average power should be at least two. Finally, the FFT calculations could be performed for few different data sets, which are created using different number of data points used for short-term average power calculations. In a preferred embodiment the FFT calculations are performed for minimum two data sets created using one or two or three-point average power calculations. If resulting FFT provide similar sets of frequencies then the resulting frequencies characterizing the stress waves are validated. The FFT calculations can be performed for data created with higher number of data points used to calculate the average power. As long as resulting frequency set confirms data obtained with fewer data points then one can conclude that the micro vibration effect is evident for a period of time corresponding to the number of data points in average power calculations divided by the sampling frequency $f_S$. One should note, that in case of a very short stress wave only FFT using very few point average power will have significant peak values.

Figure 2:
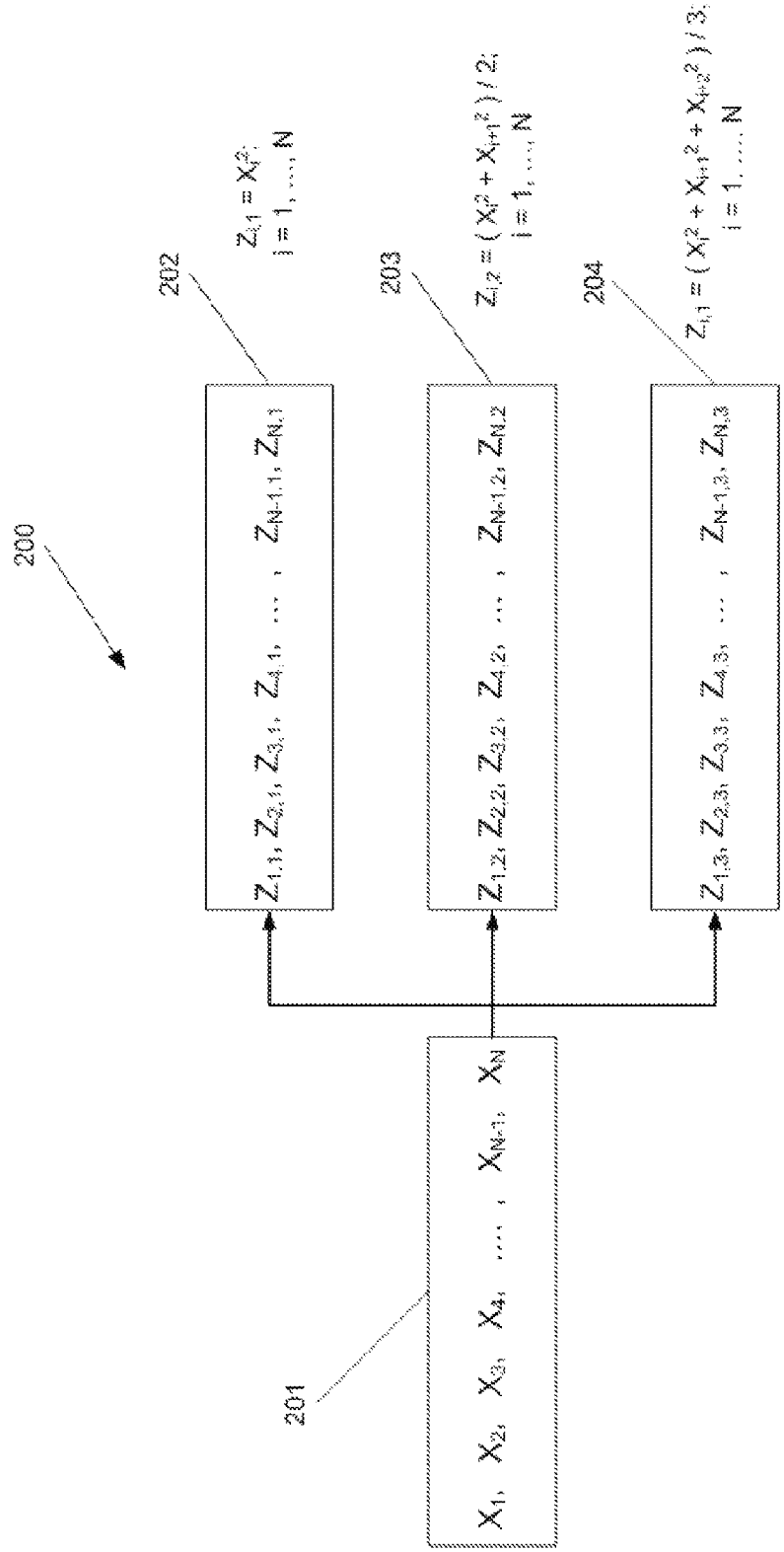
FIG. 2 illustrates an embodiment of two main steps of the stress wave detection method, the digital processing of the macro-sample.

FIG. 2 illustrates the method of processing the macro-sample data set 200 into set of data points for FFT calculations (step e and f of the invention method). Data set 201 represent the original macro-sample data set from data acquisition unit, $x_1, x_2, \ldots, x_N$.

Data set 202 depicts the set of data representing the short-term average power calculated using a single original data point $x_i$. The one-point short-term average power $z_{i,1}$ is calculated as follows:

$$z_{i,1} = x_i^2; i=1, \ldots, N$$

The maximum value of $z_{i,1}$ is taken as a measure of strongest vibration activity within the macro-sample interval of time and used as a data point $y_i$ for FFT calculations.

$$y_{i,1} = \max\{z_{i,1}; i=1, \ldots, N\}$$

Data set 203 shows the set of data representing the short-term average power calculated using two original data point $x_i$ and a sliding time window. The two-point short-term average power $z_{i,2}$ is calculated as follows:

$$z_{i,2} = (x_i^2 + x_{i+1}^2)/2; i=1, \ldots, N$$

The maximum value of $z_{i,2}$ is taken as a measure of strongest vibration activity within the macro-sample interval of time and used as a data point $y_i$ for FFT calculations.

$$y_{i,2} = \max\{z_{i,2}; i=1, \ldots, N\}$$

Data set 204 depicts the set of data representing the short-term average power calculated using three original data point $x_i$ and a sliding window. The three-point short-term average power $z_{i,3}$ is calculated as follows:

$$z_{i,3} = (x_i^2 x_{i+1}^2 + x_{i+2}^2)/2; i=1, \ldots, N$$

The maximum value of $z_{i,3}$ is taken as a measure of strongest vibration activity within the macro-sample interval of time and used as a data point $y_i$ for FFT calculations.

$$y_{i,3} = \max\{z_{i,3}; i=1, \ldots, N\}$$

Data sets for 4-point, 5-point and more short term average power can be easily generated. Practically, however, data sets for 10-point and more will not be useful since the energy of stress wave is very much concentrated around its peak value. It should be noted that the number of points spanning over a stress wave depends on the sampling frequency. In the preferred embodiment the sampling frequency should provide at least ten data points over the duration of a stress wave.

Figure 3:
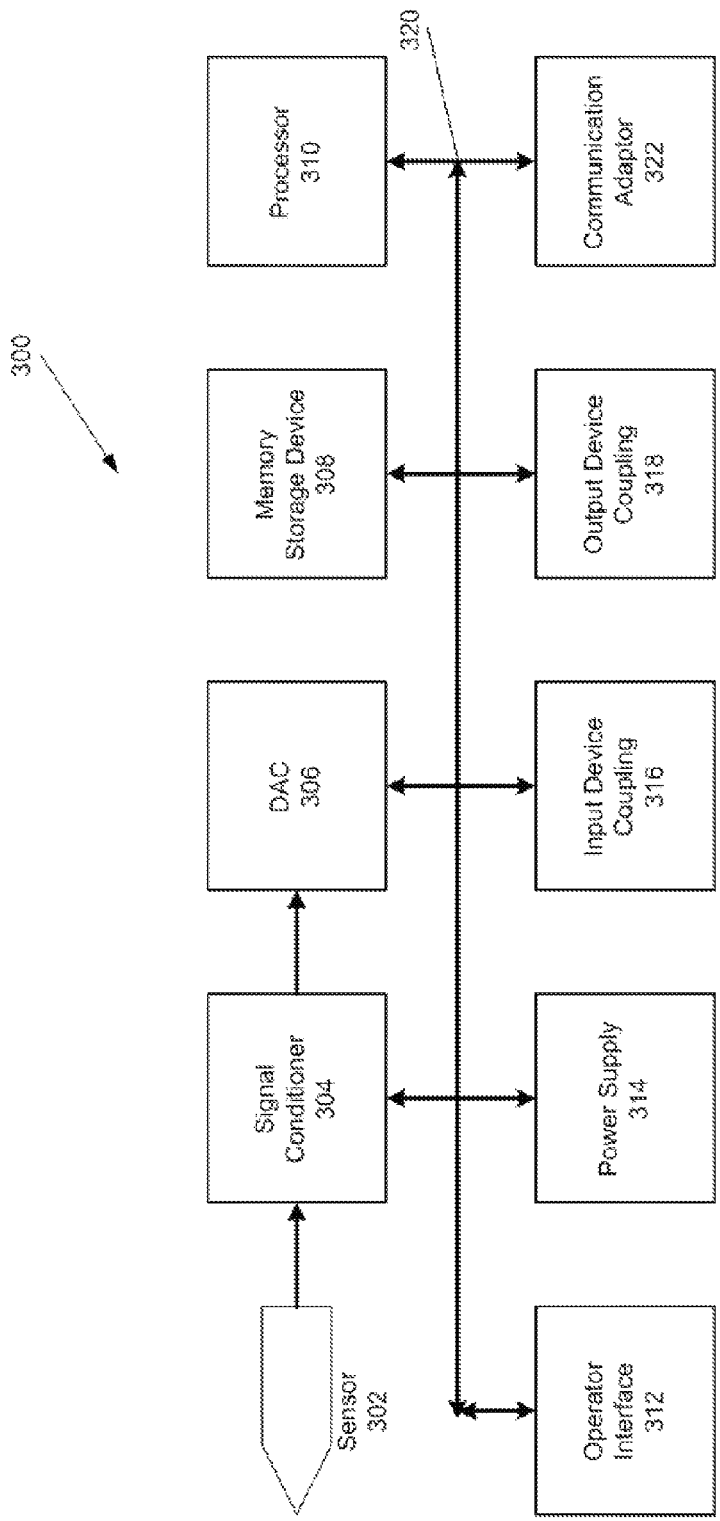
FIG. 3 illustrates an embodiment of an implementation of an apparatus for the stress wave detection.

FIG. 3 illustrates an embodiment of the stress wave detection apparatus 300 that includes a vibration sensor 302, signal conditioner 304, digital to analog converter 306, a processor 310, user interface device 312, power supply 314, memory and storage device 308, one or more output device couplings 318, and one or more input device couplings 316, and may include one or more communication adaptors 322.

Signal conditioner may include high or band pass filter to separate stress waves from vibration signal.

Communication between the memory, the processor, the outputs coupled at 318, the inputs coupled at 316 may be performed by way of one or more communication busses 320. Those busses 320 may include, for example, a system bus, a peripheral component interface bus, and an industry standard architecture bus.

The input 316 could include a tachometer signal which could be used to perform synchronous average of the filtered signal or short-term average power signals $Z_i$ or even selected maximum average power, $Y_i$ for each predetermined amount of time.

The memory 308 may include any memory device including, for example, random access memory (RAM), dynamic RAM, and/or read only memory (ROM) (e.g., programmable ROM, erasable programmable ROM, or electronically erasable programmable ROM) and may store computer program instructions and information. The memory may furthermore be partitioned into sections including an operating system partition in which operating system instructions are stored, a data partition in which data is stored, and an stress wave application partition in which instructions for carrying out the data processing are stored. The stress wave detection application may store program instructions and allow execution by the processor 310.

The processor 310 may execute the program instructions and process the data stored in the memory 308. In one embodiment, the instructions are stored in memory 308 in a compressed and/or encrypted format. As used herein the phrase, "executed by a processor" is intended to encompass instructions stored in a compressed and/or encrypted format, as well as instructions that may be compiled or installed by an installer before being executed by the processor 310.

The communication adaptor 322 permits communication between the device 300 and other devices or nodes coupled to the communication adaptor 322 directly or through a network. The communication adaptor 322 may be a network interface that transfers information from one or more nodes on a network to the device 300. The network may be a local or wide area network, such as, for example, the Internet or the World Wide Web. The device 300 may alternately or in addition be coupled directly to one or more other devices such as the monitoring computer.

It should be recognized that any or all of the components 302-322 of the stress wave detection apparatus 300 may be implemented in a single machine.

While the invention has been disclosed with reference to certain embodiments, numerous modifications, alterations, and changes to the described embodiments are possible without departing from the scope of the invention, as defined in the appended claims. Accordingly, it is intended that the invention not be limited to the described embodiments, but that it have the full scope defined by the language of the following claims, and equivalents thereof.

What is claimed is:

1. A method for sensing and analyzing the stress waves and other similar short term vibration events, comprising the steps of:

sensing motion comprising of a stress wave or short term vibration event and macro scale vibration component, and converting the motion into some kind of measurable signal;

separating the stress wave or short term vibration event from macro scale vibration component with a high or band pass filter applied to the measurable signal, wherein the resulting filtered signal is proportional to the stress wave or other short term vibration event;

acquiring and digitizing the filtered signal;

processing the digitized filtered signal for each predetermined interval of time (macro-sample time interval) using a short term energy measure or average signal power calculated over a short time window being a fraction of said predetermined interval of time, wherein calculations are performed using sliding time window and are done for every distinct time window position within the predetermined interval of time;

creating multiple output signals by selecting a maximum short term energy value calculated for said predetermined interval of time from all other short term energy values calculated for said predetermined interval using sliding short time window, wherein the multiple signals are created by changing the duration of the sliding window; and performing multiple Fast Fourier Transforms (FFT) to determine a presence of stress wave and characterize its duration.

2. The method of claim 1, wherein the duration of said short term window for average power calculations is configurable to at least two different values and calculations of the average power for different window durations are performed simultaneously.

3. The method of claim 1, wherein the measurable signal is an electrical or an optical signal.

4. The apparatus for sensing and analyzing the stress waves and other similar short term vibration events, comprising:
   a vibration sensor;
   a signal conditioner with high pass or band pass filter;
   a digital acquisition unit
   a processor; and
   a memory or programmable logic device which stores a program configured for implementing the following steps:
sensing motion comprising of a stress wave or short term vibration event and macro scale vibration component, and converting the motion into some kind of measurable signal;
   separating the stress wave or short term vibration event from macro scale vibration component with a high or band pass filter applied to the measurable signal, wherein the resulting filtered signal is proportional to the stress wave or other short term vibration event;
acquiring and digitizing the filtered signal;
processing the digitized filtered signal for each predetermined interval of time (macro-sample time interval) using a short term energy measure or average signal power calculated over a short time window being a fraction of said predetermined interval of time, wherein calculations are performed using sliding time window and are done for every distinct time window position within the predetermined interval of time;
creating multiple output signals by selecting a maximum short term energy value calculated for said predetermined interval of time from all other short term energy values calculated for said predetermined interval using sliding short time window, wherein the multiple signals are created by changing the duration of the sliding window; and
performing multiple Fast Fourier Transforms (FFT) to determine a presence of stress wave and characterize its duration.

* * * * *